United States Patent
Berube et al.

(10) Patent No.: US 10,437,912 B2
(45) Date of Patent: Oct. 8, 2019

(54) SORTING AND DISPLAYING DOCUMENTS ACCORDING TO SENTIMENT LEVEL IN AN ONLINE COMMUNITY

(71) Applicant: INTERNATIONAL BUSINESS MACHINES CORPORATION, Armonk, NY (US)

(72) Inventors: Richard E. Berube, Nashua, NH (US); Robert E. Loredo, North Miami Beach, FL (US); Fang Lu, Billerica, MA (US); Susan Ricercato, Westford, MA (US); Zi Sardone, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 200 days.

(21) Appl. No.: 14/194,510

(22) Filed: Feb. 28, 2014

(65) Prior Publication Data

US 2015/0248409 A1    Sep. 3, 2015

(51) Int. Cl.
*G06F 17/21* (2006.01)
*G06F 16/93* (2019.01)
(Continued)

(52) U.S. Cl.
CPC ............ *G06F 17/211* (2013.01); *G06F 16/93* (2019.01); *G06F 16/958* (2019.01); *G06F 17/2785* (2013.01)

(58) Field of Classification Search
CPC ......... G06F 17/30528; G06F 17/30699; G06F 17/30846; G06F 17/40; G06F 17/30997;
(Continued)

(56) References Cited

U.S. PATENT DOCUMENTS 6,049,777 A   4/2000  Sheena et al.
7,987,188 B2  7/2011  Neylon et al.
(Continued)

FOREIGN PATENT DOCUMENTS

CN    102780651    11/2012

*Primary Examiner* — Hosain T Alam
*Assistant Examiner* — Saba Ahmed
(74) *Attorney, Agent, or Firm* — The Steadman Law Firm PLLC (57) ABSTRACT

An approach is described for sorting and displaying documents according to sentiment level in an online community. An associated system may include a processor and a memory storing an application program, which, when executed on the processor, performs an operation that may include selecting a review topic in an online community and identifying a plurality of documents contributed for the review topic. The plurality of documents may include at least one of a product review submission, a marketing survey submission, a social network activity stream post, a discussion forum post, a weblog post, and an audiovisual sample. The operation further may include obtaining sentiment data associated with each of the plurality of documents developing a sentiment model based on the obtained sentiment data. Additionally, the operation may include organizing and presenting the plurality of documents in an online community interface based on the sentiment model.

18 Claims, 5 Drawing Sheets

(51) Int. Cl.
*G06F 16/958* (2019.01)
*G06F 17/27* (2006.01)

(58) Field of Classification Search
CPC ............ G06F 17/30554; G06F 17/212; G06F 17/211; G06F 17/2785; G06F 17/30011; G06F 17/3089; G06F 16/93; G06F 16/958
USPC ...................................................... 707/748
See application file for complete search history.

(56) References Cited

U.S. PATENT DOCUMENTS

| | | | |
|---|---|---|---|
| 8,166,026 B1* | 4/2012 | Sadler | G06F 17/30867 707/722 |
| 8,271,902 B1 | 9/2012 | Mangini et al. | |
| 8,417,713 B1* | 4/2013 | Blair-Goldensohn | G06F 17/30699 707/751 |
| 8,554,701 B1 | 10/2013 | Dillard et al. | |
| 9,009,126 B2 | 4/2015 | Spivack et al. | |
| 9,183,203 B1* | 11/2015 | Tuchman | G06F 17/30011 |
| 2004/0186824 A1* | 9/2004 | Delic | G06F 17/30707 |
| 2006/0042483 A1* | 3/2006 | Work | G06Q 10/00 101/91 |
| 2007/0078671 A1 | 4/2007 | Dave et al. | |
| 2007/0185865 A1* | 8/2007 | Budzik | G06F 17/30389 |
| 2007/0226204 A1* | 9/2007 | Feldman | G06F 17/3061 |
| 2008/0096532 A1 | 4/2008 | Lyle et al. | |
| 2008/0133488 A1 | 6/2008 | Bandaru et al. | |
| 2008/0154883 A1 | 6/2008 | Chowdhury et al. | |
| 2008/0222132 A1* | 9/2008 | Pan | G06F 17/30867 |
| 2009/0002178 A1 | 1/2009 | Guday et al. | |
| 2009/0193011 A1 | 7/2009 | Blair-Goldensohn et al. | |
| 2009/0193328 A1 | 7/2009 | Reis et al. | |
| 2009/0216524 A1* | 8/2009 | Skubacz | G06F 17/2785 704/9 |
| 2009/0248399 A1* | 10/2009 | Au | G06F 17/27 704/9 |
| 2010/0070486 A1* | 3/2010 | Punaganti Venkata | G06F 17/30893 707/722 |
| 2010/0262454 A1* | 10/2010 | Sommer | G06F 17/3071 706/20 |
| 2011/0137906 A1 | 6/2011 | Cai et al. | |
| 2011/0246463 A1 | 10/2011 | Carson, Jr. et al. | |
| 2011/0282860 A1* | 11/2011 | Baarman | G06F 17/30864 707/709 |
| 2012/0041937 A1* | 2/2012 | Dhillon | G06F 17/30731 707/708 |
| 2012/0047219 A1 | 2/2012 | Feng et al. | |
| 2012/0101808 A1 | 4/2012 | Duong-Van | |
| 2012/0244506 A1* | 9/2012 | Lang | G09B 5/06 434/322 |
| 2012/0254060 A1 | 10/2012 | Choudhary et al. | |
| 2012/0278253 A1 | 11/2012 | Gahlot et al. | |
| 2012/0326962 A1* | 12/2012 | Asai | H04N 1/00474 345/156 |
| 2012/0330946 A1* | 12/2012 | Arredondo | G06F 17/30528 707/728 |
| 2013/0018874 A1* | 1/2013 | Qiao | G06F 17/30864 707/723 |
| 2013/0018875 A1* | 1/2013 | Qiao | G06F 17/30657 707/723 |
| 2013/0018894 A1* | 1/2013 | Qiao | G06F 17/30719 707/748 |
| 2013/0262258 A1* | 10/2013 | Jennings | G06Q 30/0631 705/26.4 |
| 2014/0088952 A1* | 3/2014 | Fife | G06F 17/27 704/9 |

\* cited by examiner

SORTING AND DISPLAYING DOCUMENTS ACCORDING TO SENTIMENT LEVEL IN AN ONLINE COMMUNITY

BACKGROUND

The various embodiments described herein generally relate to document processing. More specifically, the various embodiments describe techniques of sorting and displaying documents according to sentiment level in an online community.

Participants in an online community often submit documented posts in response to a given topic. Such online community may include one or more of a social network, an electronic marketplace, a discussion forum, or a weblog. Many of such posts may include sentimental language motivated primarily by emotion or bias. For instance, certain posts may include language reflecting a relatively high level of anger or hyperbole, which may unduly influence the viewpoint of a client or may inhibit the ability of a client to interpret and evaluate the topic. In fact, many such posts may not accurately reflect the analysis of the author of such posts, as they may have been composed when the author was under duress or uniquely influenced by factors leading to an unusually emotional state.

Since many online communities display documented posts based primarily on timing or frequency, posts including language of relatively high sentiment may be prominently displayed in an online community interface of the client, especially if such posts were submitted recently or were submitted by an author who posts frequently. Furthermore, less sentimental posts including analysis that may be more useful to the client in terms of interpreting and evaluating the topic may be displayed less prominently in the online community interface, especially if such posts were not submitted recently or were submitted by an author who posts rarely. Consequently, content in an online community interface may be presented in a manner inconsistent with client needs or preferences.

SUMMARY

The various embodiments of the invention provide techniques for sorting and displaying documents based on sentiment level in an online community. An associated method may include selecting a review topic in an online community and identifying a plurality of documents contributed for the review topic. The plurality of documents may include at least one of a product review submission, a marketing survey submission, a social network activity stream post, a discussion forum post, a weblog post, and an audiovisual sample. Additionally, the method may include obtaining sentiment data associated with each of the plurality of documents and developing a sentiment model based on the obtained sentiment data. The method further may include organizing and presenting the plurality of documents in an online community interface based on the sentiment model.

In an embodiment, the method step of obtaining sentiment data associated with each of the plurality of documents may include selecting content associated with each of the plurality of documents and sending, to a sentiment processing application, the selected content associated with each of the plurality of documents. Such method step further may include receiving, from the sentiment processing application, sentiment data corresponding to language elements in each of the plurality of documents. The language elements may be determined from the selected content. Additionally, such method step further may include creating sentiment context data for each of the plurality of documents based on the received sentiment data and appending the sentiment context data created for each of the plurality of documents to associated metadata.

According to a further embodiment, the method step of developing a sentiment model based on the obtained sentiment data may include, for each document among the plurality of documents, calculating a sentiment score for each language element in the document and calculating a sentiment score for the document based upon the respective sentiment scores calculated for the language elements of the document. Calculating the sentiment score for each language element in the document may include establishing predefined rules based upon one or more factors. Such one or more factors may include at least one of polarity of sentiment, level of sentiment, level of bias, use of figures of speech, and use of indicia of emphasis. Furthermore, calculating the sentiment score for the document based upon the respective sentiment scores calculated for the language elements of the document may include one of determining a sum of the respective sentiment scores calculated for all of the language elements of the document, determining an average of the respective sentiment scores calculated for all of the language elements of the document, determining the sum of the respective sentiment scores calculated for a designated subset of the language elements of the document, or averaging the respective sentiment scores calculated for a designated subset of the language elements of the document.

In a further embodiment, the method step of organizing and presenting the plurality of documents based on the sentiment model may include sorting the plurality of documents by assigning priority values according to calculated sentiment score, such that documents that have respectively lower sentiment scores are assigned respectively higher priority values. Upon determining that there is at least one group of documents assigned a same priority value consequent to the sort, such method step further may include differentiating priority values by applying at least one tie-break technique to each group of documents. Additionally, the method step may include displaying the sorted plurality of documents in the online community interface. Documents assigned respectively higher priority values may be displayed more prominently than documents assigned respectively lower priority values. Any document among the plurality of documents assigned a priority value lower than a designated threshold value may be omitted from display according to such embodiment. Additionally or alternatively, any document among the plurality of documents having a sentiment score higher than a designated threshold value may be omitted from display according to such embodiment.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing a content management application program, which, when executed on the processor, performs one or more steps of the above recited method.

BRIEF DESCRIPTION OF THE SEVERAL VIEWS OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

The various embodiments described herein are directed to techniques for sorting and displaying documents based on sentiment level in an online community. According to one embodiment, an application interfacing with an online community may select a review topic and identify a plurality of documents contributed for such topic. According to such embodiment, the application may be a client application running on a client computing system. Additionally, for purposes of this disclosure, the plurality of documents may be textual or audiovisual. Specifically, the plurality of documents may include at least one of a product review submission, a marketing survey submission, a social network activity stream post, a discussion forum post, a weblog post, and an audiovisual sample.

The client application may obtain sentiment data associated with each of the plurality of documents. In an embodiment, the client application may obtain such sentiment data via a sentiment processing application. Specifically, the client application may select content associated with each of the plurality of documents and may send the selected content to the sentiment processing application. The client application in turn may receive from the sentiment processing application sentiment data corresponding to language elements in each of the plurality of documents. The language elements in each of the plurality of documents may be determined by processing the selected content associated with each of the plurality of documents.

Furthermore, the client application may develop a sentiment model based on the obtained sentiment data. In an embodiment, the client application may develop a sentiment model by calculating a sentiment score for each language element in each of the plurality of documents and by calculating a sentiment score for each of the plurality of documents based upon the respective sentiment scores calculated for the language elements of the document. The client application may calculate the sentiment score for each language element by establishing predefined rules based on one or more factors. The client application may calculate the sentiment score for each of the plurality of documents by determining a sum or average of all or a subset of the respective sentiment scores calculated for the language elements of the document.

Additionally, the client application may organize and present the plurality of documents based on the sentiment model. In an embodiment, the client application may sort the plurality of documents by assigning priority values according to sentiment score, such that documents that have respectively lower sentiment scores are assigned respectively higher priority values. If there are one or more groups of documents assigned a same priority value as a result of the sort, the client application may differentiate the priority values for each document within the one or more groups of documents by applying one or more tiebreak techniques. Upon sorting the plurality of documents and resolving any ties, the client application may display the sorted plurality of documents in the online community interface. Documents assigned respectively higher priority values may be displayed more prominently in the online community interface than documents assigned respectively lower priority values. In an embodiment, the client application may omit from display any document among the plurality of documents that is assigned a priority value lower than a designated threshold value. In a further embodiment, the client application may omit from display any document among the plurality of documents having a sentiment score higher than a designated threshold value.

The various embodiments of the invention described herein may have various advantages over conventional techniques of sorting and displaying documents in an online community. Rather than displaying documents based primarily on timing or frequency, the various embodiments provided herein may display documents based on sentiment level such that documents composed by an author under duress or in a highly emotional state may be presented less prominently to a client.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for sorting and displaying documents based on sentiment level in an online community. However, it should be understood that the techniques described herein may be adapted to a variety of purposes in addition to those specifically described herein. Accordingly, references to specific embodiments are included to be illustrative and not limiting.

Figure 1:
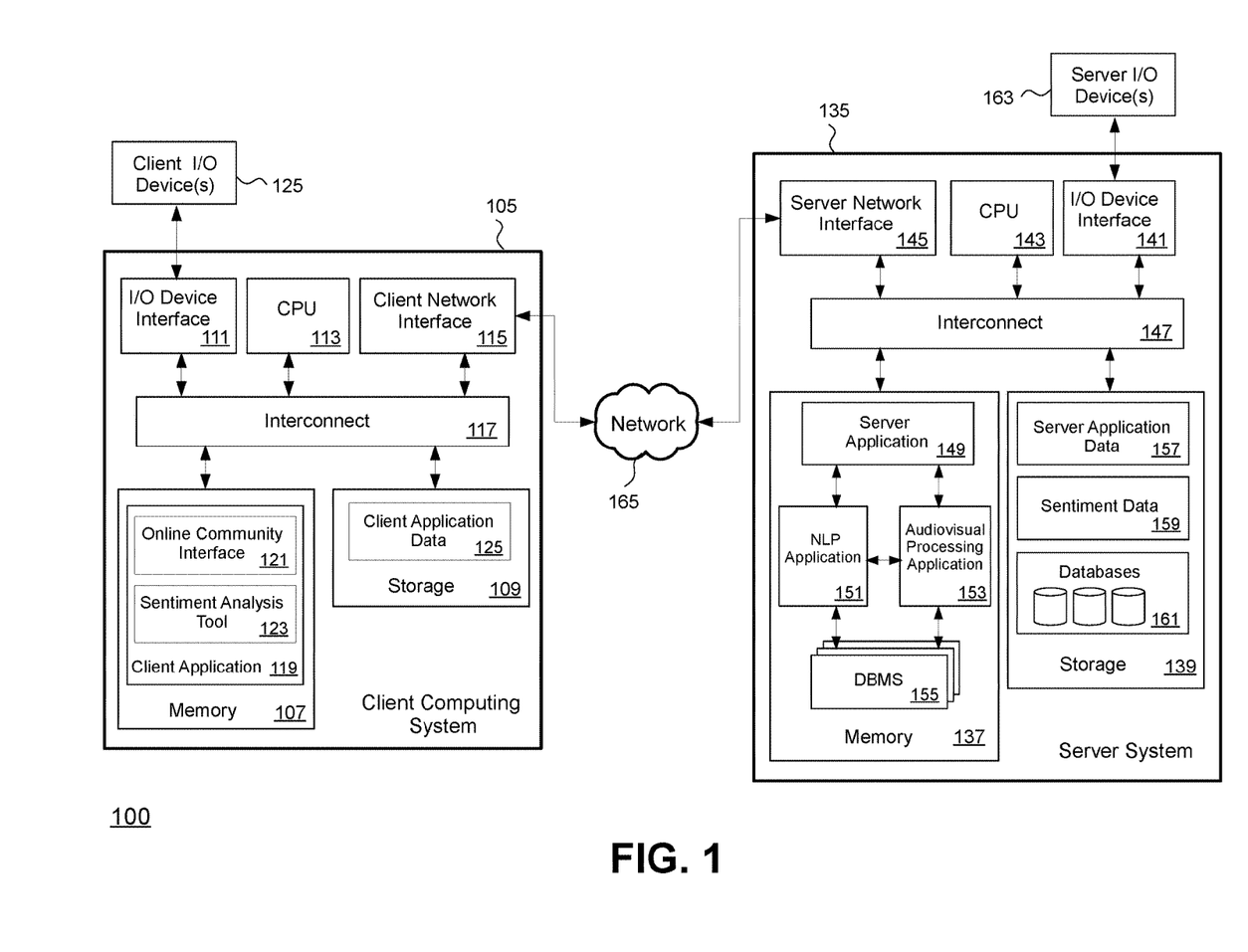
FIG. 1 illustrates a computing infrastructure, according to an embodiment.

FIG. 1 illustrates a computing infrastructure 100 according to an embodiment. As shown, computing infrastructure 100 includes a client computing system 105 and a server system 135, each connected to a communications network 165. Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. I/O device interface 111 may be communicatively coupled to one or more client I/O devices 125. CPU 113 is included to be representative of a single CPU, multiple CPUs, a single CPU having multiple processing cores, and the like. Client network interface 115 may receive data from and transmit data to server system 135 via network 165.

Memory 107 may include a client application 119 that enables client computing system 105 to interface with an online community. Client application 119 may include an online community interface 121. Depending on the characteristics of the relevant online community, online community interface 121 may be one or more of a social networking interface, an electronic marketplace interface, or an interface to a discussion forum. Client application 119 further may include a sentiment analysis tool 123. Sentiment analysis tool 123 may facilitate development of a sentiment model in accordance with the various embodiments described herein. Storage 109 may include client application data 125 associated with client application 119.

Server system 135 may include a memory 137, storage 139, I/O device interface 141, a CPU 143, and a server network interface 145, all of which may be interconnected via interconnect 147 (e.g., a bus). Memory 137 may include a server application 149, a natural language processing (NLP) application 151, an audiovisual processing application 153, and a database management system (DBMS) 155. DBMS 155 is included be representative of a single database system or multiple database systems. Storage 139 may include server application data 157, sentiment data 159, and databases 161. Databases 161 may include one or more relational databases. While FIG. 1 illustrates three databases 161, computing infrastructure 100 may include any number of databases. According to an embodiment, DBMS 155 may send requests to remote databases (not shown) via network 165.

Server application 149 may generate and process server application data 157 based on interaction with client computing system 105. To address requests of client computing system 105, server application 149 may send such requests to NLP application 151 or audiovisual processing application 153. NLP application 151 may receive document content from client application 119 via server application 149 and may generate sentiment data 159 corresponding to such content. Examples of NLP application 151 include Stanford CoreNLP and IBM® SPSS® Text Analytics for Surveys. According to one embodiment, audiovisual processing application 153 may receive audiovisual content from client application 119 via server application 149 and may transcribe audio or video data from such audiovisual content into text and subsequently may send the generated text to NLP application 151 for further processing. According to a further embodiment, audiovisual processing application 153 may process audiovisual content to directly generate sentiment data 159. To facilitate generation of sentiment data 159, NLP application 151 or audiovisual processing application 153 may send database requests to DBMS 155. DBMS 155 may include a software application configured to manage databases 161.

I/O device interface 141 may be communicatively coupled to one or more server I/O devices 163. CPU 143 is included to be representative of a single CPU, multiple CPUs, a single CPU having multiple processing cores, and the like. Server network interface 145 may receive data from and transmit data to client computing system 105 via network 165. Specifically, server social networking application 149 may accept requests sent by client computing system 105 to server system 135 and may transmit data to client computing system 105 via server network interface 145.

Figure 2:
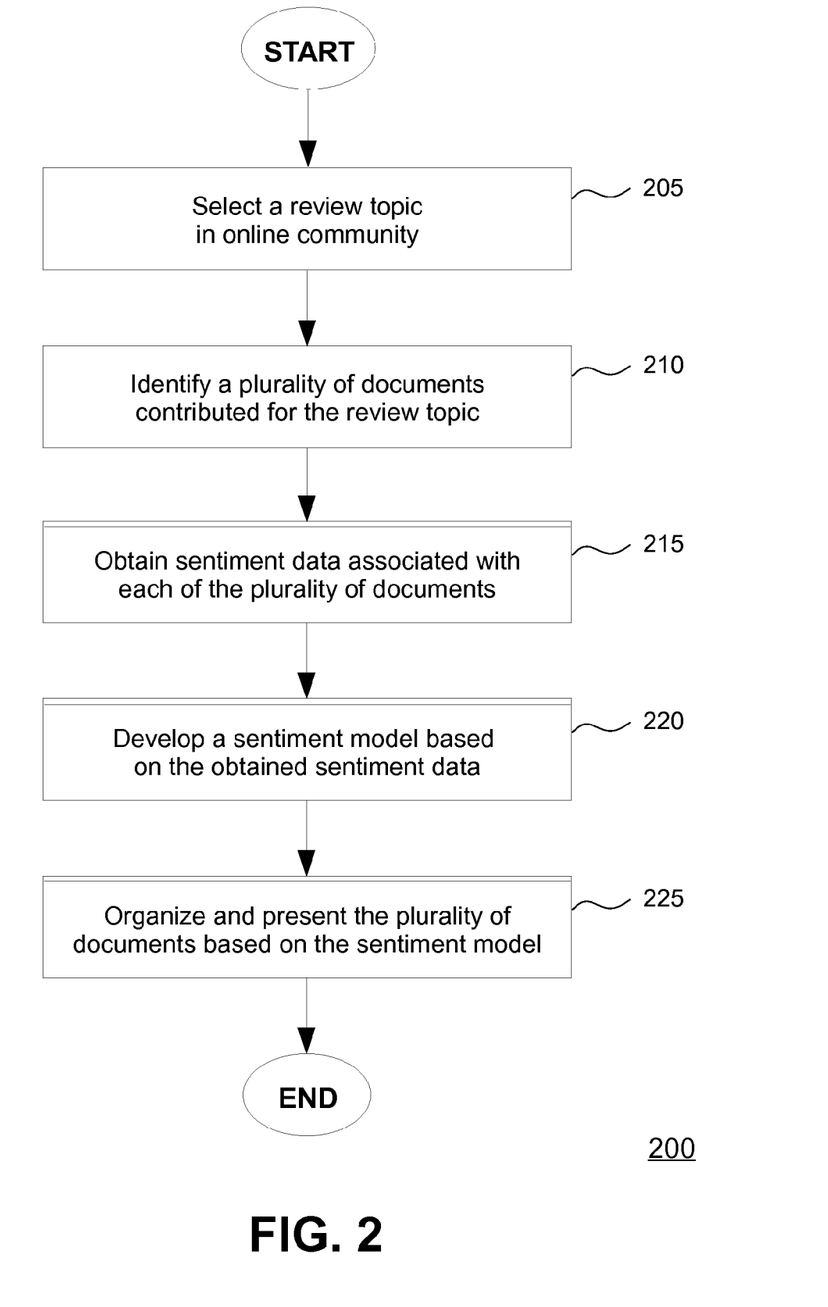
FIG. 2 illustrates a method of arranging a plurality of documents according to sentiment level in an online community, according to an embodiment.

FIG. 2 illustrates a method 200 of arranging a plurality of documents according to sentiment level in an online community, according to an embodiment. A client application (e.g., client application 119) running on a client computing system (e.g., client computing system 105) may sort the plurality of documents according to the method 200. Furthermore, the client application may display the sorted documents according to the method 200 in an online community interface of a client (e.g., online community interface 121). For purposes of this disclosure, a user of the client computing system is referred to as a client.

The method 200 may begin at step 205, where the client application may select a review topic in an online community. The online community may include a social network, an electronic marketplace, a discussion forum, or any other online community involving a group of participants. The review topic may have a designated social, commercial, and/or political theme. The client application may display information associated with the review topic in the online community interface of the client. At step 210, the client application may identify a plurality of documents contributed for the review topic. A document in the context of this disclosure may include written text and/or one or more audiovisual elements (e.g., having audio and/or video data). Furthermore, a document in the context of this disclosure may include at least one of a product review submission, a marketing survey submission, a social network activity stream post, a discussion forum post, a weblog post, and an audiovisual sample.

At step 215, the client application may obtain sentiment data associated with each of the plurality of documents. A technique for obtaining sentiment data is further described herein with respect to FIG. 3. At step 220, the client application may develop a sentiment model based on the obtained sentiment data. A technique for developing such sentiment model is further described herein with respect to FIG. 4. At step 225, the client application may organize and present the plurality of documents in an online community interface based on the sentiment model. A technique for organizing and presenting the plurality of documents based on the sentiment model is further described herein with respect to FIG. 5.

Figure 3:
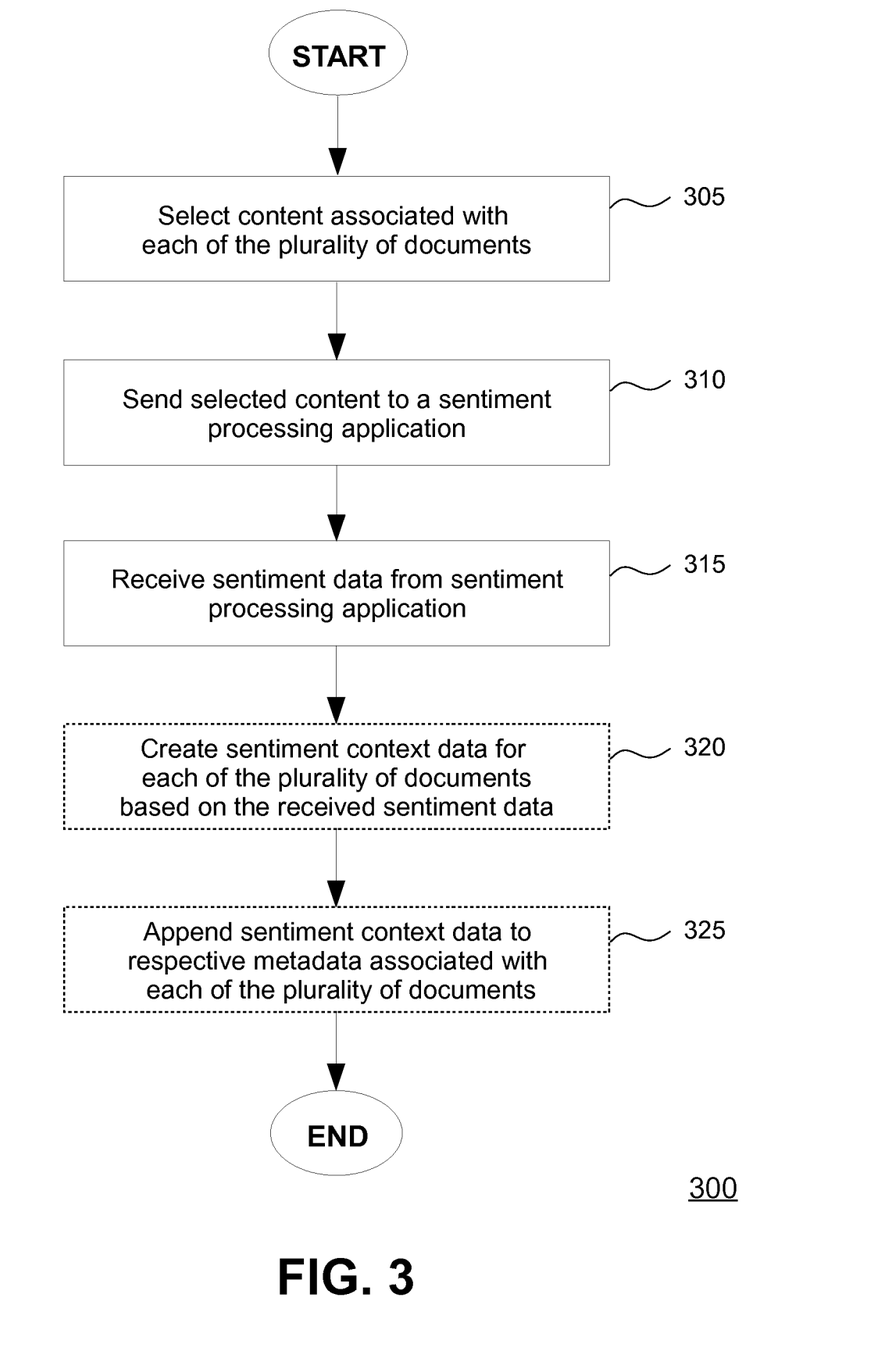
FIG. 3 illustrates a method of obtaining sentiment data associated with each of the plurality of documents, according to an embodiment.

FIG. 3 illustrates a method 300 of obtaining sentiment data associated with each of the plurality of documents, according to an embodiment. The method 300 provides an embodiment with respect to step 215 of the method 200. The method 300 may begin at step 305, where the client application may select content associated with each of the plurality of documents. The content selected for each document may be extracted from at least one of metadata associated with the document or primary content within the document (i.e., non-metadata). Metadata associated with a document may include at least one of data describing attributes of the document (e.g., document creation date, document modification date) and one or more tags provided by the author of the document pertaining to subject matter therein (e.g., a "seagull" tag provided by an author of a discussion forum post regarding coastal birds). Primary content associated with a document may include at least one of readable text within the document and audiovisual content (e.g., audio or video) within the document.

At step 310, the client application may send the selected content associated with each of the plurality of documents to a sentiment processing application. In the context of this disclosure, a sentiment processing application is an application having a capability to compile and process sentiment data. In an embodiment, such sentiment processing application may be a server application (e.g., server application 149 of server system 135), and the client application may send the selected content associated with each of the plurality of documents to the server application via a network (e.g., network 165). In such embodiment, the server application may determine sentiment data corresponding to language elements in each of the plurality of documents. The language elements in each of the plurality of documents may be determined from the selected content associated with each of the plurality of documents sent by the client application.

More specifically, according to such embodiment the server application may send any textual content among the selected content associated with each of the plurality of documents to a NLP application (e.g., NLP application 151). The NLP application may determine and process each language element (e.g., n-gram) within the textual content expressing a complete thought and may generate sentiment data (e.g., sentiment data 159) for each such language element. Additionally, the server application may send any audiovisual content among the selected content associated with each of the plurality of documents to an audiovisual processing application (e.g., audiovisual processing application 153). The audiovisual processing application may transcribe audio or video data from such audiovisual content into text and subsequently may send the generated text to the NLP application for further processing. Additionally or alternatively, the audiovisual processing application may determine and process each language element within such audiovisual content expressing a complete thought and may directly generate sentiment data for each such language element. The NLP application and/or the audiovisual processing application may transmit generated sentiment data to the server application, which may compile sentiment data corresponding to the language elements in each of the plurality of documents as determined from the selected content associated with each of the plurality of documents.

At step 315, the client application may receive from the sentiment processing application (e.g., the server application in the aforementioned embodiment) sentiment data corresponding to the language elements in each of the plurality of documents. Optionally, at step 320 the client application may create sentiment context data for each of the plurality of documents based on the received sentiment data, and at step 325 the client application may append the sentiment context data created for each of the plurality of documents to respective metadata associated with each document.

Figure 4:
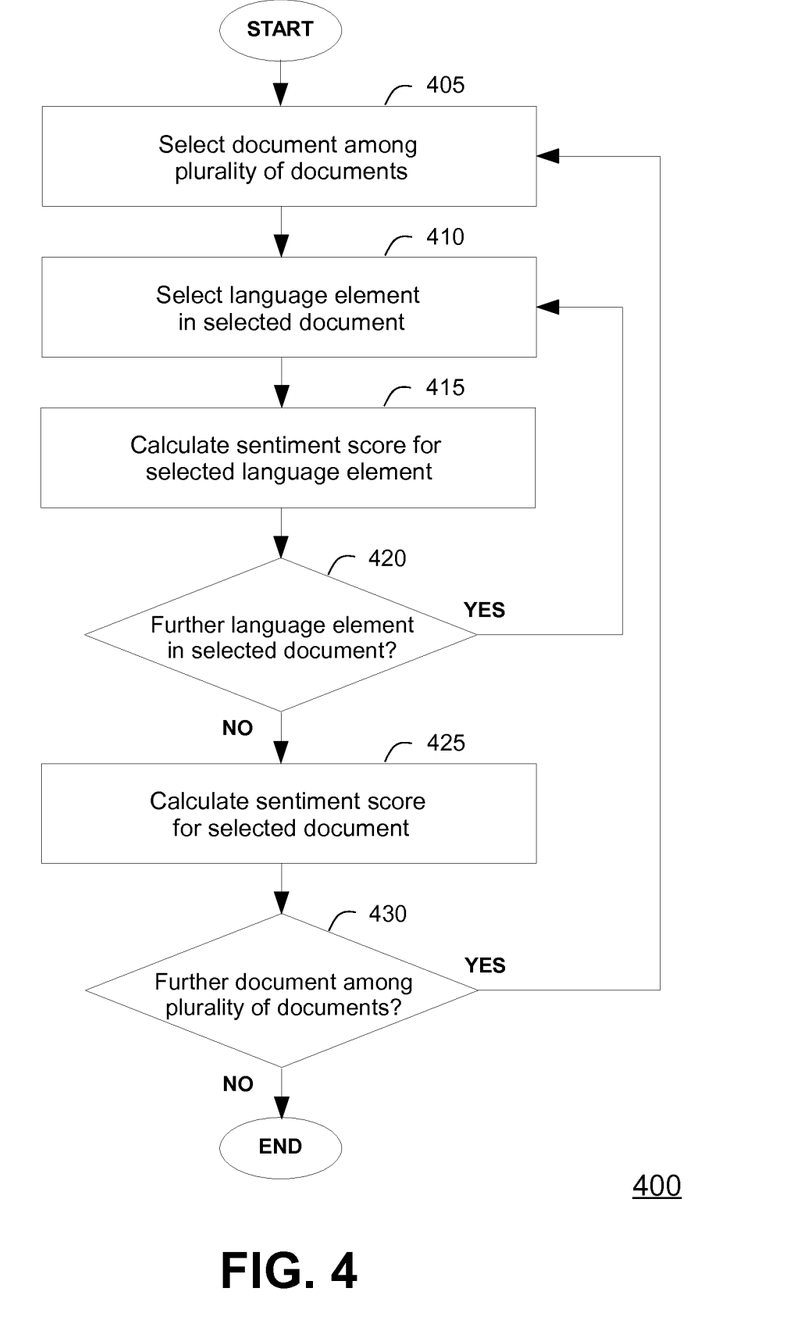
FIG. 4 illustrates a method of developing a sentiment model based on the obtained sentiment data, according to an embodiment.

FIG. 4 illustrates a method 400 of developing a sentiment model based on the obtained sentiment data, according to an embodiment. The method 400 provides an embodiment with respect to step 220 of the method 200. According to the method 400, the client application may analyze the sentiment data corresponding to each language element in each of the plurality of documents to calculate a sentiment score for such language element. The client application may calculate a sentiment score for each document based on the sentiment score(s) calculated for each language element in the document.

The method 400 may begin at step 405, where the client application may select a document among the plurality of documents. At step 410, the client application may select a language element among the language elements in the selected document. At step 415, the client application may calculate a sentiment score for the selected language element based on the sentiment data corresponding to the selected language element. A sentiment analysis tool of the client application (e.g., sentiment analysis tool 123) may facilitate calculation of such sentiment score.

According to an embodiment, to calculate the sentiment score for the selected language element at step 415, the sentiment analysis tool of the client application may establish predefined rules based upon one or more factors. Such factors may include one or more of polarity of sentiment, level of sentiment, level of bias, use of figures of speech, and use of indicia of emphasis. Additionally, the sentiment analysis tool may consider other factors not specifically referenced herein. In an embodiment, the client application may provide the client an option to adjust which factors are considered in establishing the predefined rules. Additionally, the client application may provide the client an option to determine the relative weights of the various factors and/or how the factors are considered in establishing the predefined rules. As a result of considering one or more factors, the sentiment analysis tool may assign a relatively higher or lower sentiment score to a language element compared to the respective sentiment scores of other language elements under consideration.

With regard to polarity of sentiment, the sentiment analysis tool may assign a relatively higher or lower sentiment score depending on positivity or negativity of sentiment within the selected language element as indicated by the relevant sentiment data. In one embodiment, the sentiment analysis tool may assign a relatively higher score to a language element with relatively higher negativity (e.g., "bad", "poor") and may assign a relatively lower score to a language element with relatively higher positivity (e.g., "good", "rich"). Conversely, in an alternative embodiment, the sentiment analysis tool may assign a relatively lower score to a language element with relatively higher negativity and may assign a relatively higher score to a language element with relatively higher positivity. In an embodiment, the client application may provide the client an option to determine how polarity is considered in the context of calculating the sentiment score for a language element. Furthermore, in such embodiment, the client application may provide the client an option to determine how positive or negative polarity impacts calculation of the sentiment score for a language element.

With regard to level of sentiment, the sentiment analysis tool may assign a relatively higher sentiment score to a language element indicating a relatively higher level of sentiment and may assign a relatively lower sentiment score to a language element indicating a relatively lower level of sentiment based on the relevant sentiment data. For example, the sentiment analysis tool may assign a relatively higher sentiment score to a language element including the language "awful" and may assign a relatively lower sentiment score to a language element including the language "bad", since "awful" indicates a higher level of sentiment than "bad". Similarly, the sentiment analysis tool may assign a relatively higher sentiment score to a language element including the language "terrific" and may assign a relatively lower sentiment score to a language element including the language "good", since "terrific" indicates a higher level of sentiment than "good". In an embodiment, the client application may provide the client an option to determine how sentiment level is considered in the context of calculating the sentiment score for a language element.

With regard to level of bias, the sentiment analysis tool may assign a relatively higher sentiment score for a language element determined to include a relatively higher level of bias based on relevant sentiment data. Instances of bias may include prejudice, partisan opinion, and/or disproportionate influence of personal opinion. For instance, in an online marketplace, the sentiment analysis tool may assign a relatively higher sentiment score to a language element reflecting a strong personal opinion with respect to an individual or company offering a product under review without due regard for the characteristics of the product itself. In an embodiment, the client application may provide the client an option to determine how bias is considered in the context of calculating the sentiment score for a language element.

With regard to use of figures of speech, the sentiment analysis tool may assign a relatively higher sentiment score for a language element determined to have one or more figures of speech. For example, the sentiment analysis tool may assign a relatively higher sentiment score to a language element determined to include sarcasm and/or hyperbole based on the relevant sentiment data. Furthermore, the sentiment analysis tool may determine sentiment score based on how many figures of speech are present in a language element. For example, the sentiment analysis tool may assign a relatively higher sentiment score to a language element including both sarcasm and hyperbole and may assign a relatively lower sentiment score to a language element including only sarcasm or including no figures of speech. In an embodiment, the client application may provide the client an option to determine how figures of speech are considered in the context of calculating the sentiment score for a language element.

With regard to use of indicia of emphasis, the sentiment analysis tool may assign a relatively higher sentiment score for a language element determined to include text decoration, emphatic punctuation, or another element indicating emphasis based on the sentiment data. For example, in a textual or an audiovisual context, the sentiment analysis tool may assign a relatively higher sentiment score to a language element including highlighted elements or text decoration such as bold text, italic text, or text presented in all capital letters. Furthermore, in an audiovisual context, the sentiment analysis tool may assign a relatively higher sentiment score to a spoken language element composed at a volume that exceeds a predefined threshold value and/or is a designated percentage above an average volume of all spoken language elements. In a further embodiment, the sentiment analysis tool may assign a relatively higher sentiment score to a language element including one or more exclamation points or question marks. According to such embodiment, the sentiment analysis tool may assign a progressively higher sentiment score based on the number of consecutive exclamation points and/or question marks. In an embodiment, the client application may provide the client an option to determine how indicia of emphasis are considered in the context of calculating the sentiment score for a language element. Specifically, the client application may provide the client an option to determine which, if any, indicia of emphasis are considered and how such indicia of emphasis are considered.

At step 420, the client application may determine whether there is a further language element to process for the selected document. If there is a further language element to process for the selected document, then the method 400 may return to step 410. If there is no further language element to process for the selected document, then at step 425 the client application may calculate a sentiment score for the selected document based upon the respective sentiment scores calculated for the language elements of the selected document. In an embodiment, the client application may calculate the sentiment score for the selected document by determining a sum of the respective sentiment scores calculated for all of the language elements of the selected document. In an alternative embodiment, the client application may calculate the sentiment score by determining an average of the respective sentiment scores calculated for all of the language elements of the selected document. In a further alternative embodiment, the client application may calculate the sentiment score by determining the sum of the respective sentiment scores calculated for a designated subset of the language elements of the selected document. In a further alternative embodiment, the client application may calculate the sentiment score by averaging the respective sentiment scores calculated for a designated subset of the language elements of the selected document.

At step 430, the client application may determine whether there is a further document to process among the plurality of documents. If there is a further document to process, then the method 400 may return to step 405. If there is no further document to process, then the method 400 may end.

Figure 5:
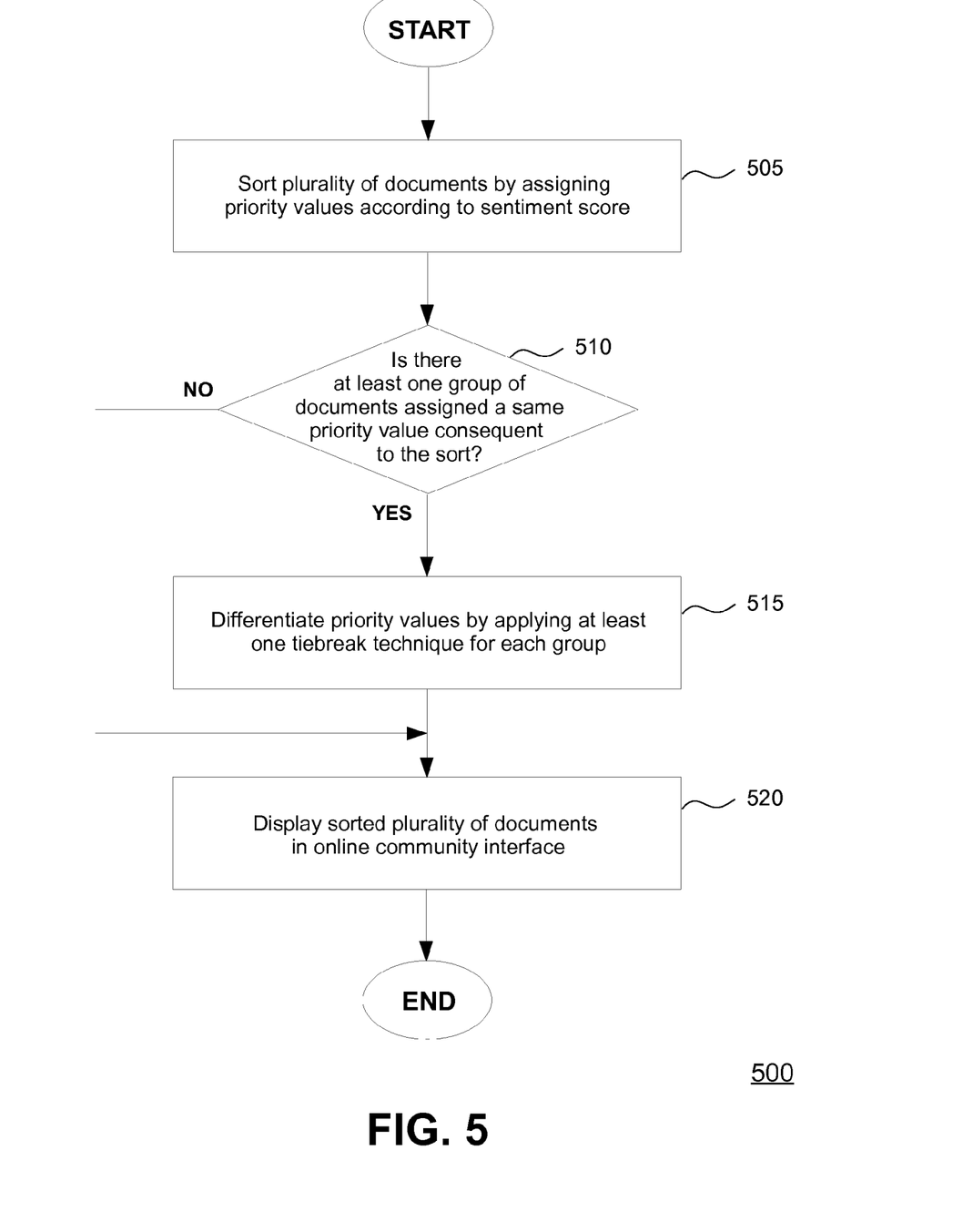
FIG. 5 illustrates a method of organizing and presenting the plurality of documents based on the sentiment model, according to an embodiment.

FIG. 5 illustrates a method 500 of organizing and presenting the plurality of documents based on the sentiment model, according to an embodiment. The method 500 provides an embodiment with respect to step 225 of the method 200. The method 500 may begin at step 505, where the client application may sort the plurality of documents by assigning priority values according to calculated sentiment score, such that documents that have respectively lower sentiment scores are assigned respectively higher priority values. Specifically, the client application may sort the plurality of documents using a sorting algorithm, which may be selected according to the resources of the client computing system and/or according to client preference.

At step 510, the client application may determine whether there is at least one group of documents that has been assigned a same priority value consequent to the sort—i.e., the client application may determine whether there is at least one group of documents having the same sentiment score. Upon determining that there are no documents assigned a same priority value consequent to the sort, the method may proceed to step 520. Upon determining that there is at least one group of documents assigned a same priority value consequent to the sort, at step 515 the client application may differentiate priority values by applying at least one tiebreak technique to each group. By applying one or more tiebreak techniques, the client application may modify any initially assigned priority values resulting in a tie to ensure that a distinct priority value is assigned to each of the plurality of documents.

According to one tiebreak technique, the client application may distinguish a group of documents having the same initially assigned priority value by comparing document polarity. In one embodiment, the client application may assign a relatively higher priority value to a first document of the group and a relatively lower priority value to a second document of the group upon determining that the overall positivity of sentiment in the language elements of the first document is higher than the overall positivity of sentiment in the language elements of the second document, as indicated by the relevant sentiment data. Conversely, in another embodiment, the client application may assign a relatively higher priority value to a first document of the group and a relatively lower priority value to a second document of the group upon determining that the overall negativity of sentiment in the language elements of the first document is higher than the overall negativity of sentiment in the language elements of the second document, as indicated by the relevant sentiment data. According to such embodiments, the client application may make analogous comparisons for each pair of documents within the group. Furthermore, the client application may provide the client an option to determine how positive or negative polarity is applied according to such tiebreak technique.

According to a further tiebreak technique, the client application may distinguish a group of documents having the same initially assigned priority value by comparing the respective modification dates of the documents. In one embodiment, the client application may assign a relatively higher priority value to a first document of the group and a relatively lower priority value to a second document of the group upon determining that the first document has a more recent modification date than the second document. According to such embodiment, the client application may make analogous comparisons for each pair of documents within the group.

According to a further tiebreak technique, the client application may distinguish a group of documents having the same initially assigned priority value by comparing attributes of the respective authors of the documents. In one embodiment, the client application may assign a relatively higher priority value to a first document of the group and a relatively lower priority value to a second document of the group upon determining that the author of the first document is more highly rated than the author of the second document in the online community. For instance, if the client application determines that the author of the first document is a "subject matter expert" who is highly rated by fellow authors in the online community and further determines that the author of the second document is relatively unknown with no established rating in the online community, the client application may assign a relatively higher priority value to the first document and may assign a relatively lower priority value to the second document. According to such embodiment, the client application may make analogous comparisons for each pair of documents within the group.

According to a further tiebreak technique, the client application may distinguish a group of documents having the same initially assigned priority value by comparing the respective attributes of the documents. In one embodiment, the client application may assign a relatively higher priority value to a first document of the group and a relatively lower priority value to a second document of the group upon determining that the first document is longer in length (e.g., includes a higher word count) than the second document. Such embodiment may permit the client application to promote consideration of relatively detailed documents. Conversely, in another embodiment, the client application may assign a relatively higher priority value to a first document of the group and a relatively lower priority value to a second document of the group upon determining that the first document is shorter in length (e.g., includes a lower word count) than the second document. Such embodiment may permit the client application to promote consideration of relatively succinct documents.

At step 520, the client application may display the sorted plurality of documents in the online community interface. Specifically, the client application may display documents assigned respectively higher priority values (i.e., having relatively lower sentiment scores) more prominently than documents assigned respectively lower priority values (i.e., having relatively higher sentiment scores) in the online community interface. For instance, the client application may order documents from top to bottom within the online community interface, with documents assigned respectively higher priorities presented toward the top of the interface and documents assigned respectively lower priorities presented toward the bottom of the interface. Accordingly, the document assigned the highest priority may be presented at top of the interface, while the document assigned the lowest priority may be presented at the bottom of the interface. Additionally or alternatively, the client application may highlight documents assigned relatively higher priorities. For instance, text associated with documents assigned relatively higher priorities may be enlarged or otherwise made more visible. Thus, the client application may display documents with a lower sentiment score more prominently and may display documents with a higher sentiment score less prominently in the online community interface.

In an embodiment, the client application may omit from display any document among the plurality of documents that is assigned a priority value lower than a designated threshold value. For instance, assuming that the plurality of documents includes twenty documents, the client application may omit from display five documents among the twenty documents having the lowest assigned priority value. In a further embodiment, the client application may omit from display any document among the plurality of documents having a sentiment score higher than a designated threshold value. Accordingly, the method 500 may promote display of documents with relatively lower sentiment while deemphasizing or omitting documents with relatively higher sentiment.

According to an embodiment, the steps of the methods 200-500 may be carried out by a server application on a server system (e.g., server application 149 on server system 135) or an application of another computing system rather than the client application on the client computing system. For instance, if the client computing system is a thin client, all processing may occur at the server system, and relevant data required for display of the client online community interface may be sent to the client computing system via the network.

According to the various embodiments described herein, a client application may sort and display documents posted for a review topic in an online community according to sentiment level. By displaying documents according to sentiment level rather than mere timing or frequency, an online community interface may prominently display content that may be more consistent with client needs or preferences.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A computer program product comprising a non-transitory computer readable storage medium having program instructions embodied therewith, the program instructions executable by a computing device to cause the computing device to:
   select a review topic in an online community;
   identify a plurality of documents contributed for the review topic;
   obtain sentiment data associated with each of the plurality of documents, wherein obtaining the sentiment data comprises selecting content associated with each of the plurality of documents and determining n-grams in each of the plurality of documents from the selected content via a software-based application capable of natural language processing;
   develop a sentiment model based on the obtained sentiment data, wherein developing the sentiment model comprises, for each document among the plurality of documents, calculating a sentiment score for each n-gram in the document by establishing predefined rules based upon one or more factors, and calculating a sentiment score for the document by determining a sum or an average of the respective sentiment scores calculated for all of the n-grams of the document, and wherein a client associated with a client computing application is provided at least one option to determine how the one or more factors are considered in establishing the predefined rules; and
   based on the sentiment model, organize and present the plurality of documents in an online community interface of the client computing application, wherein organizing and presenting the plurality of documents comprises:
      sorting the plurality of documents by assigning priority values such that documents that have respectively lower sentiment scores calculated during the development of the sentiment model are assigned respectively higher priority values;
      differentiating priority values of any group of documents assigned a same priority value by applying at least one tiebreak technique; and
      displaying the sorted plurality of documents in the online community interface, wherein documents assigned respectively higher priority values are displayed more prominently than documents assigned respectively lower priority values.

2. The computer program product of claim 1, wherein obtaining the sentiment data associated with each of the plurality of documents further comprises:
   sending, to a sentiment processing application, the selected content associated with each of the plurality of documents; and
   receiving, from the sentiment processing application, sentiment data corresponding to the n-grams in each of the plurality of documents.

3. A system comprising:
   a processor; and
   a memory storing an application program, which, when executed on the processor, performs an operation comprising:
   selecting a review topic in an online community;
   identifying a plurality of documents contributed for the review topic;
   obtaining sentiment data associated with each of the plurality of documents, wherein obtaining the sentiment data comprises selecting content associated with each of the plurality of documents and determining n-grams in each of the plurality of documents from the selected content via a software-based application capable of natural language processing;
   developing a sentiment model based on the obtained sentiment data, wherein developing the sentiment model comprises, for each document among the plurality of documents, calculating a sentiment score for each n-gram in the document by establishing predefined rules based upon one or more factors, and calculating a sentiment score for the document by determining a sum or an average of the respective sentiment scores calculated for all of the n-grams of the document, and wherein a client associated with a client computing application is provided at least one option to determine how the one or more factors are considered in establishing the predefined rules; and
   based on the sentiment model, organizing and presenting the plurality of documents in an online community interface of the client computing application, wherein organizing and presenting the plurality of documents comprises:
      sorting the plurality of documents by assigning priority values such that documents that have respectively lower sentiment scores calculated during the development of the sentiment model are assigned respectively higher priority values;
      differentiating priority values of any group of documents assigned a same priority value by applying at least one tiebreak technique; and
      displaying the sorted plurality of documents in the online community interface, wherein documents assigned respectively higher priority values are displayed more prominently than documents assigned respectively lower priority values.

4. The system of claim 3, wherein obtaining the sentiment data associated with each of the plurality of documents further comprises:
   sending, to a sentiment processing application, the selected content associated with each of the plurality of documents; and
   receiving, from the sentiment processing application, sentiment data corresponding to the n-grams in each of the plurality of documents.

5. The computer program product of claim 2, wherein obtaining the sentiment data associated with each of the plurality of documents further comprises:
   creating sentiment context data for each of the plurality of documents based on the received sentiment data corresponding to the language elements in each of the plurality of documents; and appending the sentiment context data created for each of the plurality of documents to associated metadata.

6. The computer program product of claim 1, wherein a client is provided an option to adjust which of the one or more factors are considered in establishing the predefined rules.

7. The computer program product of claim 1, wherein any document among the plurality of documents assigned a priority value lower than a designated threshold value is omitted from display.

8. The computer program product of claim 1, wherein any document among the plurality of documents having a sentiment score higher than a designated threshold value is omitted from display.

9. The system of claim 4, wherein obtaining the sentiment data associated with each of the plurality of documents further comprises:

creating sentiment context data for each of the plurality of documents based on the received sentiment data corresponding to the language elements in each of the plurality of documents; and appending the sentiment context data created for each of the plurality of documents to associated metadata.

10. The system of claim 3, wherein a client is provided an option to adjust which of the one or more factors are considered in establishing the predefined rules.

11. The system of claim 3, wherein any document among the plurality of documents assigned a priority value lower than a designated threshold value is omitted from display.

12. The system of claim 3, wherein any document among the plurality of documents having a sentiment score higher than a designated threshold value is omitted from display.

13. The computer program product of claim 1, wherein the one or more factors are selected from the group consisting of (i) level of bias, (ii) use of figures of speech, and (iii) use of indicia of emphasis.

14. The system of claim 3, wherein the one or more factors are selected from the group consisting of (i) level of bias, (ii) use of figures of speech, and (iii) use of indicia of emphasis.

15. The computer program product of claim 1, wherein, for each document among the plurality of documents, calculating a sentiment score for each n-gram in the document further comprises assigning a sentiment score to the n-gram based upon the predefined rules consequent to considering the one or more factors in the context of the n-gram relative to other n-grams.

16. The system of claim 3, wherein, for each document among the plurality of documents, calculating a sentiment score for each n-gram in the document further comprises assigning a sentiment score to the n-gram based upon the predefined rules consequent to considering the one or more factors in the context of the n-gram relative to other n-grams.

17. The computer program product of claim 1, wherein the client is provided an option to determine relative weights of the one or more factors.

18. The system of claim 3, wherein the client is provided an option to determine relative weights of the one or more factors.

* * * * *